May 3, 1938.   O. H. EICHBLATT   2,116,388
TEST TERMINAL
Filed Aug. 6, 1935   4 Sheets-Sheet 1

Otto H. Eichblatt, INVENTOR

BY Victor J. Evans & Co.
ATTORNEY

WITNESS P. J. Hickey.

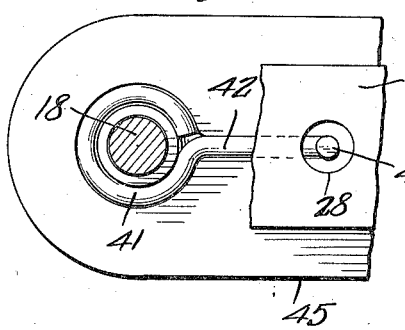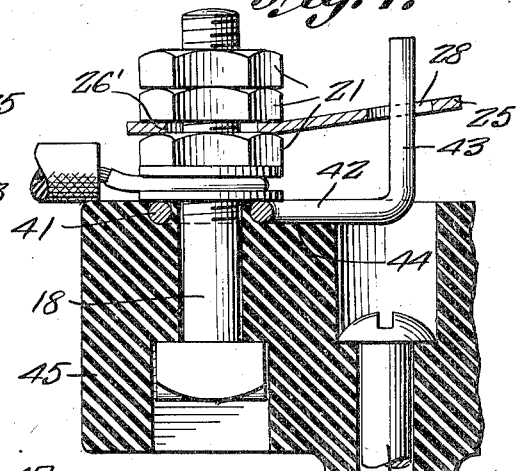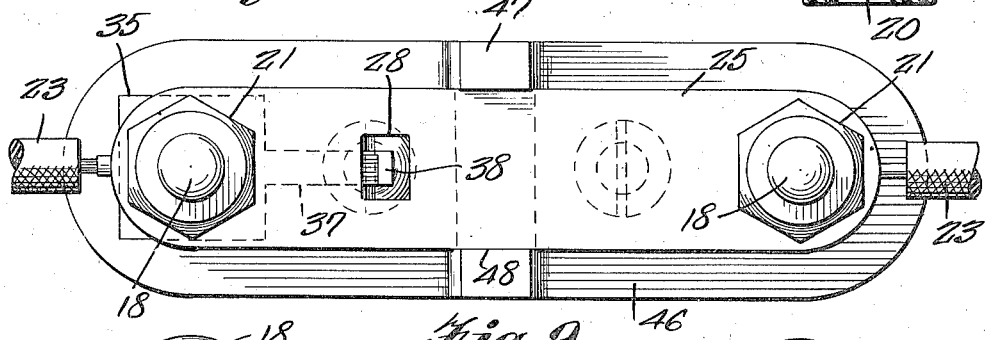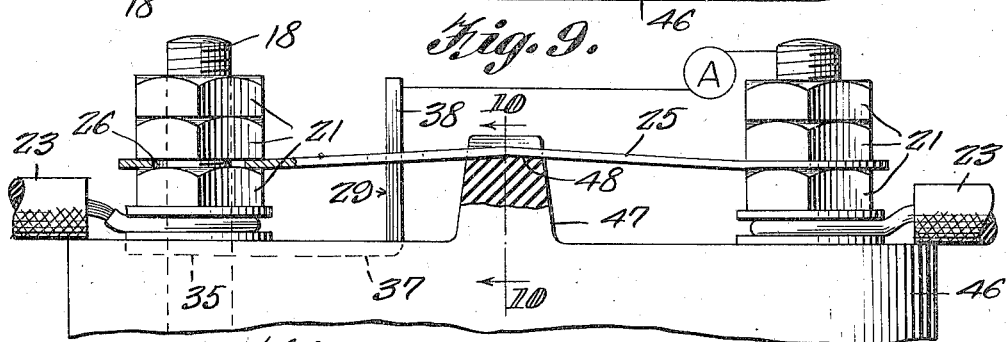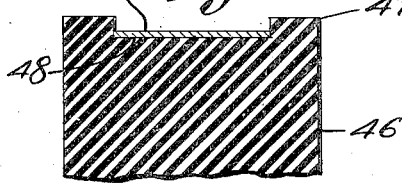

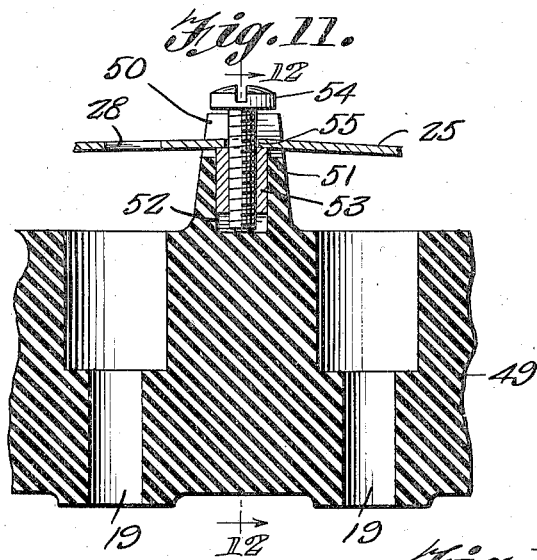
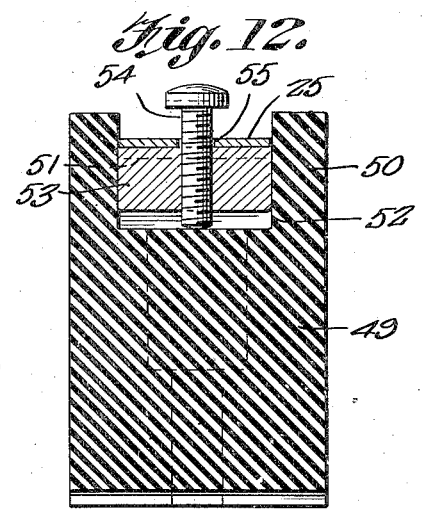
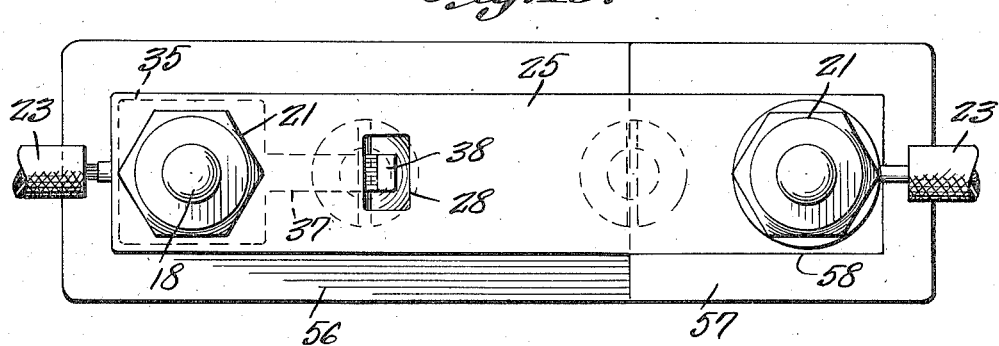
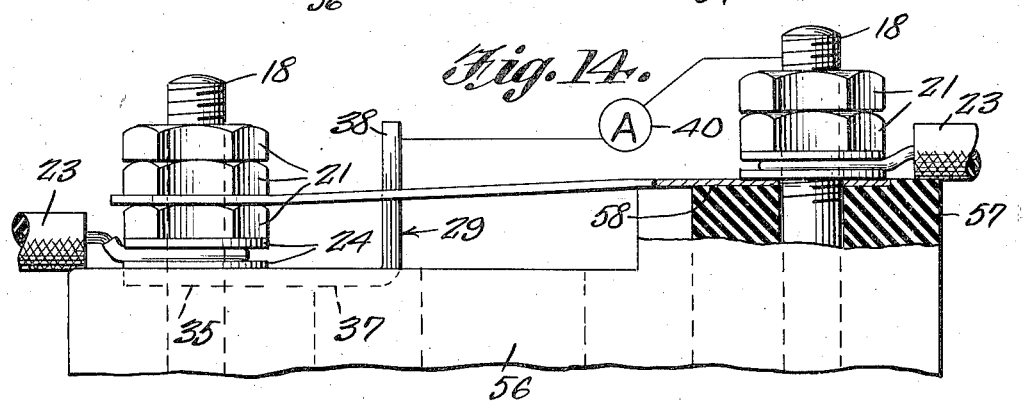

May 3, 1938.                O. H. EICHBLATT                2,116,388
                              TEST TERMINAL
                         Filed Aug. 6, 1935            4 Sheets-Sheet 4
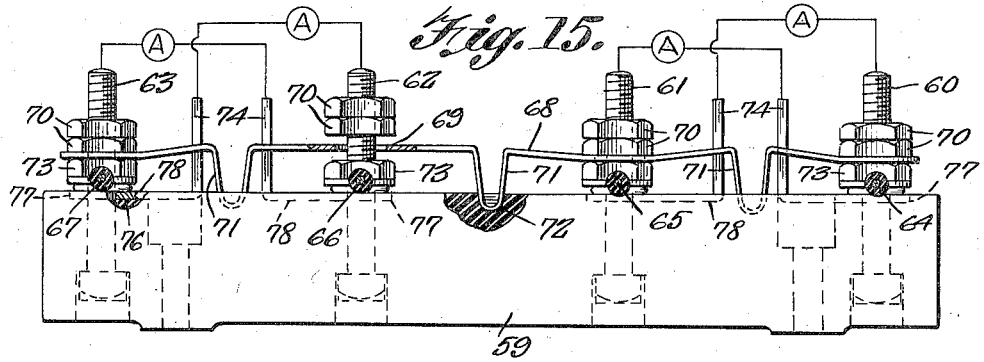
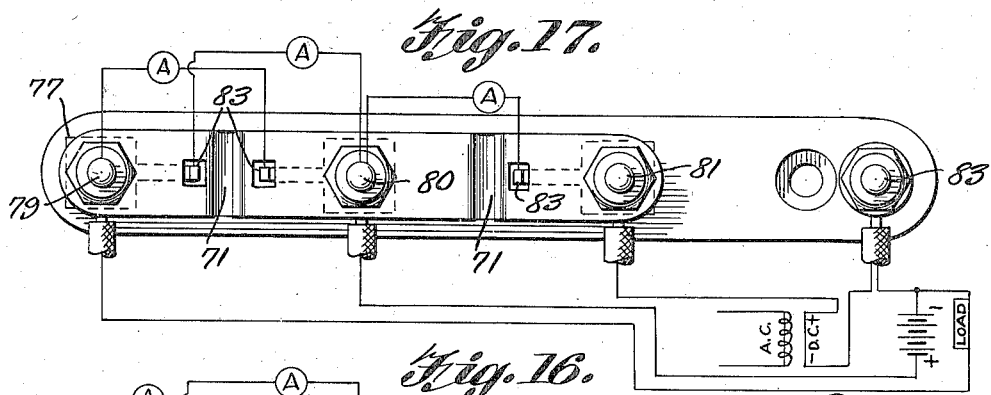
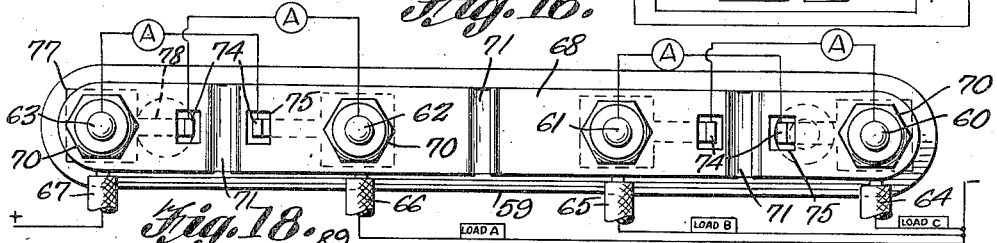
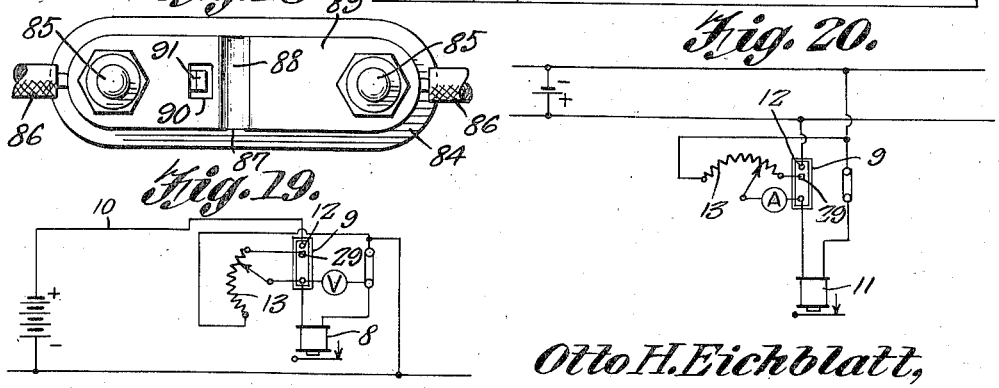
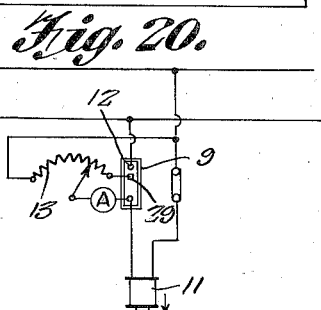
Otto H. Eichblatt,
INVENTOR
BY Victor J. Evans & Co.
ATTORNEY Patented May 3, 1938

2,116,388

UNITED STATES PATENT OFFICE 2,116,388

TEST TERMINAL

Otto H. Eichblatt, Houston, Tex.

Application August 6, 1935, Serial No. 34,978

2 Claims. (Cl. 200—158)

This invention relates to test terminals of the type used in railway signaling and other apparatus wherein the electric circuits are normally closed.

An object of the invention is to provide a test terminal which will facilitate testing of the various signaling devices in the shortest possible time and be entirely free of the hazard of short-circuiting or crossing with other circuits, the device being tested.

A further object is to provide a test terminal which permits the magnitude of current flowing in a circuit to be measured without opening the circuit.

A further object is to provide a test terminal in which dependable, adequate metal to metal contact is assured by the use of a flat metal strap and flat faced nuts.

A further object is to provide a test terminal which permits the current to be measured quickly by the mere backing off of nuts on one binding post.

A further object is to provide a test terminal which permits the use of a socket wrench to back off the nuts instead of the usual side wrench with its attendant short-circuiting and circuit crossing hazards.

A further object is to provide a test terminal having a deformed spring metal strap connecting the binding posts in circuit and releasable in minimum time to open the circuit at one of the posts and allow the current to flow through the ammeter.

A further object is to provide a test terminal having a contact post to which one of the ammeter leads may be clipped, the post being connected to and disposed laterally of the binding post at which the circuit is to be opened, whereby a socket wrench may be used to back off the nuts from said binding post after the ammeter leads have been applied.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 6 is a fragmentary plan view of a test terminal having a modified form of contact post.

Figure 7 is a detail sectional view of a test terminal equipped with the modified contact post.

Figure 8 is a plan view of a modified form of test terminal having a central deforming bridge integral with the insulating base.

Figure 9 is a side elevation of the parts shown in Figure 8.

Figure 10 is a detail cross section taken on the line 10—10 of Figure 9.

Figure 11 is a detail longitudinal section showing a modified form of deforming bridge.

Figure 12 is a cross section taken on the line 12—12 of Figure 11.

Figure 13 is a plan view showing a test terminal having a deforming shoulder on the base instead of a bridge.

Figure 14 is a side elevation of the parts shown in Figure 13.

Figure 15 is a side elevation of a multiple test terminal adapted to permit of the entire load or any of the branch circuits from the same electrical energy source, being selectively measured.

Figure 16 is a plan view of the terminal shown in Figure 15.

Figure 17 is a plan view of a test terminal similar to the terminal shown in Figure 15, but designed for a different purpose.

Figure 18 is a plan view of a single terminal of the type shown in Figure 15.

Figure 19 is a diagrammatic view showing the application of the terminal to test translating devices and the like having a relatively high resistance.

Figure 20 is a diagrammatic view showing the application of the terminal to test translating devices and the like of relatively low resistance.

In the field of railway signaling, such as automatic block signals, automatic train control, highway crossing protection devices, etc., the electric circuits are so designed as to be normally on closed circuit so that in case of circuit failure, broken rail, broken wire, etc., a danger signal will be displayed to the engineer. It is necessary for signalmen to make many tests and ascertain the magnitude of current in many circuits and their branches at fixed intervals. The major electrical tests comprise opening the circuits to ascertain if the translating devices, relays, etc., become properly deenergized when the energy is cut off, ascertain the total magnitude of current delivered by rectifiers, that delivered by storage and primary batteries and that received by the various translating devices, all preferably without opening the circuit when the current is diverted through the ammeter; testing for pick up, working and release values of translating devices by the potentiometer in terms of current or voltage to ascertain if they are operating within their field specifications. The translating devices and the like of relatively low resistance, are tested with an ammeter while those of relatively high resistance, are tested with a voltmeter. These tests are illustrated in Figures 20 and 19 respectively. In this method of testing, the resistance is cut in across the circuit at the point where the test is being made and one side of the circuit, usually the positive side, is opened. In the diagrammatic Figures 19 and 20 illustrating the use of my improved test terminal, the test terminal is shown at 9. The positive conductor 10, is disconnected from the translating devices 8 and 11 by merely backing off the nuts of the corresponding binding post at 12 with a socket wrench thus diverting the current through a variable resistance 13 which is connected in the circuit prior to backing off of the nuts. With this explanation of the use of the device a detailed description of the construction will now be given.

Figure 1:
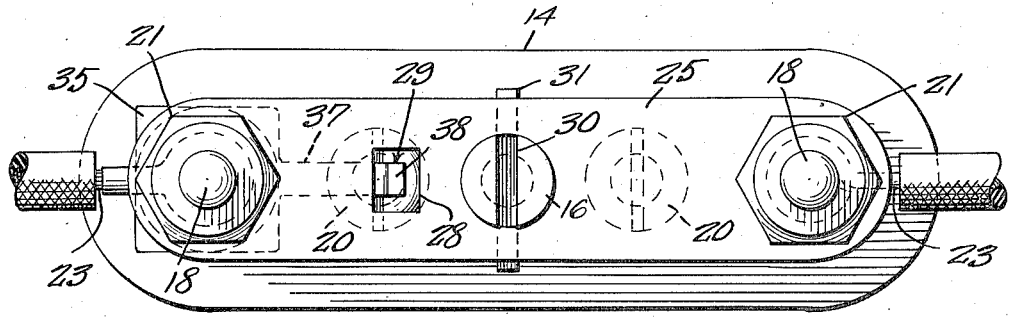
Figure 1 is a plan view of a test terminal constructed in accordance with my invention.
Figure 2:
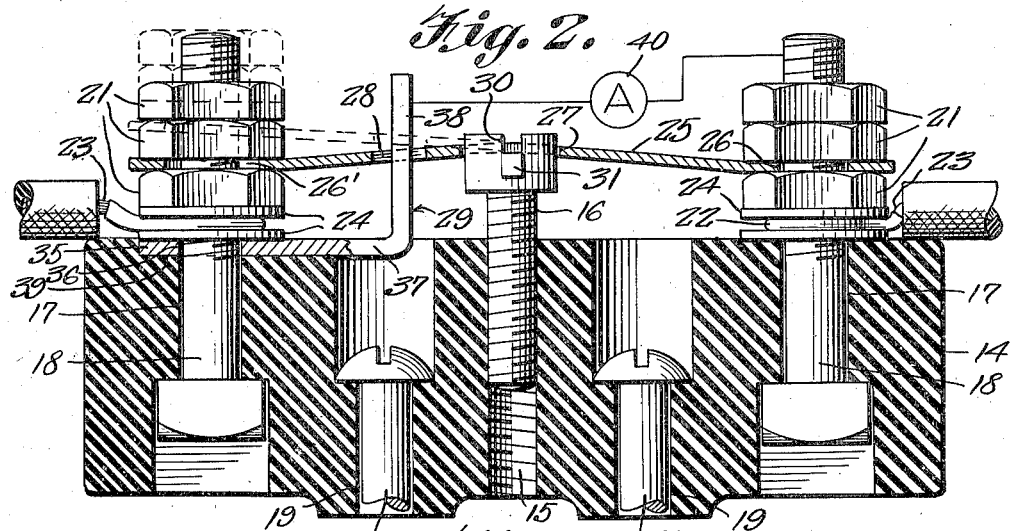
Figure 2 is a longitudinal sectional view through the test terminal.

Referring to Figures 1 and 2, 14 indicates a base formed of insulating material of such nature as to permit of an opening 15 being tapped therein to receive a deforming screw 16. The ends of the base are provided with openings 17 to receive binding posts 18 and are also provided with openings 19 to receive securing screws or bolts 20. The binding posts are of ordinary construction and are each preferably equipped with three nuts 21. The metal eyelets 22 of stranded conductors 23 encircle the posts between washers 24 and are clamped to the base by the lowermost nuts 21.

Figure 3:
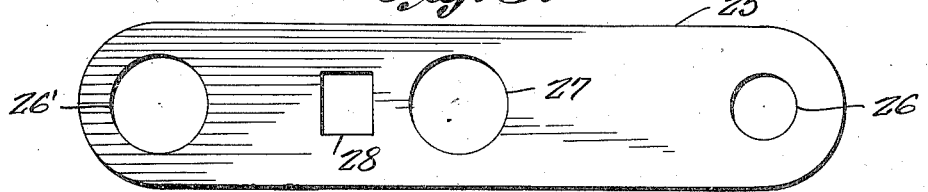
Figure 3 is a plan view of the spring metal connecting strap.

A circuit closing strap 25 of spring metal connects the binding posts in circuit and as best shown in Figure 3 the circuit closing strap is formed from a flat blank of spring metal such as brass, bronze or the like. In each end of the blank there is formed an opening as shown at 26 and 26' to receive the binding posts, the opening 26 being of a diameter to snugly fit the associated binding post, while the opening 26' is considerably larger than the diameter of the associated binding post and forms an adequate insulating air gap with that binding post when the circuit closing strap is in place and before it is deformed as will later be described. The blank is also provided centrally with an opening 27 to receive the deforming screw 16 and is in addition provided with an opening 28 intermediate the opening 27 and the large opening 26' to receive an ammeter contact post 29 which will presently be described in detail.

Figures 4, 5, 5A:
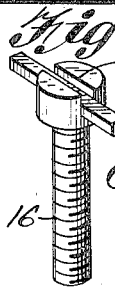
Figure 4 is a detail perspective view of the contact post.
Figure 5 is a detail perspective view of the deforming screw.
Figure 5a is a detail perspective view of a modified form of deforming screw.

As shown in Figure 5, the head of the deforming screw 16 is provided with a slot 30 which receives a bar 31 adapted to support the circuit closing strap 25 at the center, the slot being of sufficient depth to receive a screw driver for adjusting the height of the screw above the base 14. However, as shown in Figure 5a, the deforming screw 16 may be provided with a head of two different diameters as shown at 32 and 33, the largest supporting the circuit closing strap at the center, while the smallest is provided with a screw driver kerf 34.

To assemble the strap with the binding posts, the end with the small opening 26 is tightly secured to one of the binding posts by tightening the two upper nuts 21 and thereupon the deforming screw 16 may be elevated to deform the strap to the position shown in dotted line in Figure 2 whereupon the two upper nuts 21 of the other binding post may be tightened to deform the strap to the position shown in full line in Figure 2. A tight electrical connection is maintained by the metal to metal contact between the nuts and the ends of the strap. To break the circuit it is simply necessary to back off the nuts 21 shown on the left of Figure 2 whereupon the circuit closing strap will move to the position shown in dotted line and the large opening 26' will define an insulating air gap between the associated binding post and the wall of the opening.

The above referred to ammeter contact post 29, as shown in Figure 4, preferably is provided with a flat base plate 35 having a central opening 36 to receive the binding post from which the upper nuts are to be backed off to open the circuit, and from this base plate extends a lateral arm 37 which terminates in an upright post 38. The arm 37 and the base plate 35 are countersunk in a similarly shaped depression 39 formed in the top face of the base 14 so that the base plate and arm extend flush with the top face of the base 14. The ammeter contact post 38 projects upwardly through the opening 28 in the circuit closing strap 25 and said opening forms an insulating air gap around the post. It will be observed that the base plate 35 and the lowermost washer 24 of the conductor 23 form a good electric metal to metal contact.

By referring to Figure 2 it will be seen that to measure the magnitude of the electric current shown passing through the terminal, the leads of the ammeter 40 are clipped to the binding post 18 on the right of said figure and to the ammeter contact post 38. The two upper nuts 21 of the binding post on the left of the figure are then backed off with a socket wrench until the circuit closing strap does not contact with the nut above or below it. The circuit closing strap is now insulated from the binding post and the current has been diverted through the ammeter without breaking the circuit. When the current has been ascertained, the nuts are again run down with a socket wrench, and the ammeter leads removed. The circuit again has not been broken.

It will be here pointed out that the prong or vertical post 38 of the ammeter contact 29 is turned or positioned toward the opposite binding post for a specific reason. In service terminals are usually nested together vertically in horizontal rows and the conductors necessarily take off from the top and bottom of the terminals as shown. If the ammeter contact post 38 were positioned to the left of the associated binding post it would interfere with the conductors and would be more apt to be bent in handling the wiring.

Figures 6 and 7 show a modified form of ammeter contact in which the contact may be formed from a single length of stiff wire bent to provide a base ring 41 which surrounds the binding post 18 as shown in Figure 6, and from the ring the wire is bent to provide a lateral arm 42 and from thence is bent upwardly to provide an upright or vertical contact post 43 to which one of the leads of the ammeter may be clipped. As shown in Figure 7 the base ring and lateral arm are countersunk in a recess 44 formed in the top face of the insulating base 45. The remaining parts are duplicates of the similar parts above described and are given corresponding reference numerals.

Figures 8 and 9 illustrate a modified form of insulating base 46 provided on the top face with a projection or bridge 47 which performs the same function as the adjusting screw 16 above described. The bridge is provided with a recess 48 in the top face to receive the circuit closing strap 25 as best shown in Figure 10. Other parts of the test terminal are duplicates of the similar parts above described and are given corresponding reference numerals. The height of the bridge 47, of course, determines the degree of deformation of the circuit closing strap 25 when the nuts 21 are tightened down upon the releasable end of the strap, that is the end provided with the enlarged openings 26'. The operation of diverting the current through the ammeter is the same as explained in connection with the form of the invention shown in Figures 1 and 2.

In Figures 11 and 12 there is shown a still further modification of the insulating base 49, in this form of the invention the base being provided with a bridge 50 having a depression 51, best shown in Figure 11, to receive the circuit closing strap 25, the bottom of the depression being further formed with a recess 52 of substantially rectangular contour to non-rotatably receive a nut 53. An adjusting screw 54 is threaded through the nut and engages the bottom wall of the recess 52. An opening 55 is formed in the circuit closing strap 25 to loosely receive the adjusting screw. The strap is supported upon the top face of the vertical adjustable nut 53 and when the screw 54 is turned to raise or lower the nut 53 the strap 25 will be deformed and tensioned accordingly.

In Figures 13 and 14 a still further modification of the insulating base 56 is shown. In this modified form the base is provided at one end with a shoulder 57 which performs the same function as the bridges above described, that is the shoulder supports one end of the circuit closing strap 25 above the top face of the insulating base so that when the binding post nuts are tightened against the opposite end the strap will be deformed and tensioned. In this modification the lowermost binding post nut of the binding post passing through the shoulder may be dispensed with and the associated end of the strap 25 is clamped into a countersink 58 formed in the shoulder, by means of the conductor wire locking nuts on the binding post as shown.

In the railway signaling field there are usually several branches leading off from the same energy source. In such cases, a multiple test terminal is desirable so that the entire load or any of the branches may be measured. One form of a multiple test terminal suitable for the purpose is illustrated in Figures 15 and 16. In this form of the invention the insulating base 59 is provided with a plurality of binding posts 60, 61, 62 and 63 adapted to receive conductors 64, 65, 66 and 67 the latter being connected to the positive energy source and the conductors 64, 65 and 66 are individually connected to the negative return as indicated diagrammatically in Figure 16. 68 designates the circuit closing strap which in this form of the invention is formed of spring material such as brass or bronze and is provided with four openings 69 to receive the binding posts. The openings are considerably larger than the binding posts as clearly shown in Figure 15 and before the strap is deformed by running down of the nuts 70 on the binding posts these openings form an air gap with the binding posts. Midway between the binding posts the strap is provided with U shaped portions 71 the bights of which are countersunk in recesses 72 formed in the top face of the insulating base 59. The portions may be V shaped instead of U shaped in which case the depressions 72 are similarly shaped.

The U shaped portions 71 perform the triple function of first locating the circuit closing strap on the base so that the center line through the binding post openings 69 therein will coincide with the center line through the binding posts thus forming an air gap between the circuit closing strap and each binding post before it is deformed by running down the upper nuts 70. Second, to push the circuit closing strap upward by spring pressure out of contact with the lower nut 73 of any binding post when the upper nuts 70 are backed off, and third when the upper nuts are run down to deform the circuit closing strap the strap must lengthen slightly which additional length is provided by the broadening of the upper part of the U shaped portions as illustrated between the binding posts 60 and 61 and between the binding posts 62 and 63.

The ammeter contacts 74 project through the circuit closing strap and are insulated therefrom by air gaps 75 in the same manner as described in connection with the form of the invention shown by Figures 1 and 2. In order that the proper relationship, when assembling, will always be maintained with reference to the air gaps where the ammeter contact passes through the circuit closing strap, the insulating base 59 is provided with depressions 76, best shown in Figure 15, which receive the base plates 77 and the lateral arms 78 of the ammeter contacts. As explained in connection with Figures 6 and 7 the ammeter contacts may have a modified shape in which case the recesses 76 in the insulating base for positioning will be shaped to fit them.

In Figure 16 a source of electrical energy is shown attached to the binding post 63 with branch circuits leading off from the binding posts 62, 61 and 60 to loads A, B and C respectively. To measure the entire load the leads of the ammeter are clipped to the ammeter contact secured to the binding post 63 and to the binding post 62 itself, then the two upper nuts of the binding post 63 are backed off with a socket wrench until the circuit closing strap does not contact with the nut above or below it. In this position the circuit closing strap is insulated from the binding post 63. The entire load has now been diverted through the ammeter without breaking the circuit. When the current has been ascertained, the nuts of binding post 63 are again run down with a socket wrench and the ammeter leads removed. The circuit again has not been broken. Instead of putting one side of the ammeter on the binding post 62 it could as well have been put on the binding post 61 or 60.

To measure the current to load A, the leads of the ammeter are clipped to the ammeter contact secured to the binding post 62 and to the binding post 63 itself and the two upper nuts of the binding post 62 are backed off with a socket wrench until the circuit closing strap does not contact with the nut above or below it. The circuit closing strap is now insulated from the binding post 62 and the current of that branch to the load A has been diverted through the ammeter without breaking the circuit. When the current has been ascertained the nuts of the binding post 62 are again run down with a socket wrench and the ammeter leads removed. The circuit again has not been broken. Instead of putting one side of the ammeter on the binding post 63 it could as well have been put on the binding post 61 or 60.

To measure the current to load B one side of the ammeter is connected to the ammeter contact which is secured to the post 61 and the other side is secured direct to the post 60 whereupon the upper nuts of the post 61 are backed off. To measure the current load to C one side of the ammeter is connected to the ammeter contact carried by the post 60 and the other side is connected direct to the post 61 whereupon the upper nuts of the post 60 are backed off with a socket wrench. There is no guess work as to what prong of the ammeter contacts one side of the ammeter is to be attached because it is always the prong nearest to that binding post from which the conductor leads off in which it is desired to ascertain the current flowing.

In Figure 17 there is shown a test terminal adapted for a specific purpose. In the signaling field, where electrical power is accessible, in many cases where storage batteries are in use they are charged in place with rectifiers of various types. In order that the battery may be kept in a healthy state it is desirable to know the D. C. output of the rectifier, the current flowing into the battery and the current flowing to the field or load. The type of multiple test terminal illustrated in Figure 17 is suitable for use for such a purpose.

The test terminal shown in Figure 17 is in all respects identical to the multiple terminal just described except that the circuit closing strap is sufficient in length to only contact with three binding posts 79, 80 and 81. Connected to the test terminal is the D. C. side of the rectifier, storage battery and load. The positive side of the rectifier is connected to the binding post 81. The negative side of the rectifier, storage battery and load are connected to the binding post 82. The positive side of the battery is connected to the binding post 80 and the positive side of the field devices to be served (load) is connected to the binding post 79.

To measure the D. C. output of the rectifier, the leads of the ammeter are clipped to the ammeter contact 83 secured to the binding post 81, and to the binding post 80, then the two upper nuts of the binding post 81 are backed off with a socket wrench until the circuit closing strap 84 does not contact with the nuts above or below it. The strap is then insulated from the binding post 81 and the entire output of the rectifier has now been diverted through the ammeter without breaking the circuit. When the rectifier output has been ascertained the nuts of the binding post 81 are again tightened with a socket wrench and the ammeter leads removed. The circuit again has not been broken. Instead of putting one side of the ammeter on the binding post 80 it could as well have been put on the binding post 79.

To measure the charging current from the rectifier to the storage battery, the leads of the ammeter are clipped to the ammeter contact secured to the binding post 80, and to the binding post 79 direct, and the two upper nuts of the binding post 80 are then backed off with a socket wrench until the circuit closing strap does not contact with the nut above or below it. The charging current to the storage battery has now been diverted through the ammeter without breaking the circuit. When the charging current has been ascertained, the nuts of the binding post 80 are again tightened with the socket wrench and the ammeter leads are removed. The circuit again has not been broken. Instead of putting one side of the ammeter on the binding post 79 it could as well have been put on the binding post 81.

To measure the current flowing to the field (load), the leads of the ammeter are clipped to the ammeter contact secured to the binding post 79, and direct to the binding post 80, whereupon the two upper nuts of the binding post 79 are backed off until the circuit closing strap does not contact with the nut above or below it. The current to the load has now been diverted through the ammeter without breaking the circuit. When the current has been ascertained the nuts of the binding post 79 are again screwed tight with a socket wrench and the ammeter leads removed without the circuit being broken. Instead of putting one side of the ammeter on the binding post 80 it could as well have been put on the binding post 81.

In Figure 18 there is shown a modified test terminal in which the insulating base 84 is provided with binding posts 85 adapted to receive conductors 86 and midway between the posts the top face of the base is provided with a countersink 87 to receive the U shaped portion 88 of a resilient circuit closing strap 89 which is one section of the multiple strap shown in Figure 15 and is provided with an opening 90 to receive the ammeter contact 91 which is a duplicate of the ammeter contact 74 above described and illustrated in Figure 16. The binding post opening at one end of the strap snugly fits the binding post while the binding post opening at the opposite end of the strap is considerably larger than the diameter of the associated binding post as illustrated in Figure 2.

Figures 19 and 20 illustrate the test terminal used with a resistance connected across the circuit as is customary in practice. The translating devices and the like 11, shown in Figure 20, being of relatively low resistance are tested with an ammeter while translating devices and the like 8, shown in Figure 19, being of relatively high resistance are tested with a voltmeter. In this method of testing, the resistance 13 is cut in across the circuit at the point where the test is being made and one side of the circuit, usually the positive side, is opened. In both figures my test terminal is shown at 9 and the positive conductor is disconnected from the translating device by merely backing off the upper nuts at 12 and diverting the current through a variable resistance connected to the test instrument contact 29.

From the above description it is thought that the construction and operation of my invention will be fully understood without further explanation.

What is claimed is:

1. A device of the class described for use in testing railway signalling apparatus wherein the circuits are normally closed, comprising an insulating base, binding posts on the base adapted to receive signal circuit wires, a resilient circuit closing strap disposed substantially parallel with one face of the base and connecting the binding posts, said strap having an opening loosely receiving one of the posts, nuts securing the strap to the posts, said strap being adapted to spring out of circuit closing position when the nut of the post passing loosely through said opening is backed off, and an L-shaped member carried by the last named post and having a leg extending parallel with the post loosely through an opening in said strap, said L-shaped terminal being always out of electrical contact with the strap and when the last mentioned nut is backed off coacting with the other post in forming terminals for the attachment of a test instrument.

2. A device of the class described for use in testing railway signalling apparatus wherein the circuits are normally closed, comprising an insulating base, binding posts on the base adapted to receive signal circuit wires, a resilient circuit closing strap disposed substantially parallel with one face of the base and connecting the binding posts, said strap having an opening loosely receiving one of the posts, nuts securing the strap to the posts, said strap being adapted to spring out of circuit closing position when the nut of the post passing loosely through said opening is backed off, an L-shaped member carried by the last named post and having a leg extending parallel with the post loosely through an opening in said strap, said L-shaped terminal being always out of electrical contact with the strap and when the last mentioned nut is backed off coacting with the other post in forming terminals for the attachment of a test instrument, and means carried by the base engaging the strap for tensioning the strap.

OTTO H. EICHBLATT.